US010012747B2

United States Patent
Wang et al.

(10) Patent No.: US 10,012,747 B2
(45) Date of Patent: Jul. 3, 2018

(54) DEVICE AND METHOD FOR JOINT 3-DIMENSIONAL DEGHOSTING OF MULTIPLE VINTAGES

(71) Applicant: CGG SERVICES SA, Massy (FR)

(72) Inventors: Ping Wang, Sugar Land, TX (US); Suryadeep Ray, Houston, TX (US)

(73) Assignee: CGG SERVICES SAS, Massy (FR)

( * ) Notice: Subject to any disclaimer, the term of this patent is extended or adjusted under 35 U.S.C. 154(b) by 247 days.

(21) Appl. No.: 14/967,558

(22) Filed: Dec. 14, 2015

(65) Prior Publication Data

US 2016/0291185 A1 Oct. 6, 2016

Related U.S. Application Data

(60) Provisional application No. 62/139,880, filed on Mar. 30, 2015.

(51) Int. Cl.
| | |
|---|---|
| *G01V 1/00* | (2006.01) |
| *G01V 1/36* | (2006.01) |
| *G01V 1/28* | (2006.01) |
| *G01V 1/38* | (2006.01) |
| *G01V 1/32* | (2006.01) |

(52) U.S. Cl.
CPC .............. *G01V 1/364* (2013.01); *G01V 1/282* (2013.01); *G01V 1/38* (2013.01); *G01V 1/32* (2013.01); *G01V 2210/1293* (2013.01); *G01V 2210/1423* (2013.01); *G01V 2210/47* (2013.01); *G01V 2210/48* (2013.01); *G01V 2210/56* (2013.01)

(58) Field of Classification Search
CPC .......................... G01V 1/364; G01V 2210/56
USPC ........................................................ 702/16
See application file for complete search history.

(56) References Cited

U.S. PATENT DOCUMENTS

| | | | |
|---|---|---|---|
| 2014/0198605 A1* | 7/2014 | Grion ..................... | G01V 1/308 367/7 |
| 2014/0365135 A1* | 12/2014 | Poole ...................... | G01V 1/36 702/17 |

(Continued)

OTHER PUBLICATIONS

D. Carlson et al., "Increased Resolution and Penetration from a Towed Dual-Sensor Streamer", First Break, Dec. 2007, vol. 25, pp. 71-77.

(Continued)

*Primary Examiner* — Anthony Ho
(74) *Attorney, Agent, or Firm* — Patent Portfolio Builders PLLC

(57) ABSTRACT

Computing device, computer instructions and method for jointly deghosting first and second 3-dimensional (3D) seismic vintages of a same subsurface. The method includes receiving the first 3D vintage; receiving the second 3D vintage, wherein the second 3D vintage is taken later in time than the first 3D vintage, over the same subsurface; jointly deghosting the first and second 3D vintages based on a common ghost-free model $U_0$, a first vintage ghost-free model $U_b$, and a second vintage ghost-free model $U_m$; and generating an image of the subsurface indicative of changes between the first and second 3D vintages based on the common ghost-free model $U_0$.

20 Claims, 8 Drawing Sheets

(56) References Cited

U.S. PATENT DOCUMENTS

| | | | | |
|---|---|---|---|---|
| 2016/0109597 A1* | 4/2016 | Hoeber | ............... | G01V 1/308 |
| | | | | 702/17 |
| 2016/0131784 A1* | 5/2016 | Siliqi | ............... | G01V 1/362 |
| | | | | 367/24 |
| 2017/0123090 A1* | 5/2017 | Khalil | ............... | G01V 1/345 |
| 2017/0248716 A1* | 8/2017 | Poole | ............... | G01V 1/282 |

OTHER PUBLICATIONS

E. Hicks et al., "An Efficient 4D Processing Flow for Variable-depth Streamer Data", The Leading Edge, Feb. 2014, 33, pp. 172-178.

A. K. Özdemir et al., "Optimized Deghosting of Over/Under Towed-Streamer Data in the Presence of Noise", The Leading Edge, Feb. 2008, 27, pp. 190-199.

G. Poole et al., "Shot-to-shot Directional Designature Using Near-Field Hydrophone Data", SEG 83rd Annual International Meeting, Houston, Texas, Expanded Abstracts, Sep. 22-27, 2013, pp. 4236-4240.

G. Poole, "Pre-migration Receiver De-ghosting and Re-datuming for Variable Depth Streamer Data", SEG 83rd Annual International Meeting, Houston, Texas, Expanded Abstracts, Sep. 22-27, 2013, pp. 4216-4220.

C. Riyanti et al., "Pressure Wave-field Deghosting for Non-Horizontal Streamers", SEG 78th Annual International Meeting, Las Vegas, Nevada, Expanded Abstracts, Nov. 9-14, 2008, pp. 2652-2656.

J. O.A. Robertson et al., "On the Use of Multicomponent Streamer Recordings for Reconstruction of Pressure Wavefields in the Crossline Direction", Geophysics, Sep.-Oct. 2008, vol. 73, No. 5, pp. A45-A49.

R. Soubaras et al., "Variable-depth Streamer—a Broadband Marine Solution", First Break, Dec. 2010, vol. 28, pp. 89-96.

C.A. Van Der Schans et al., "Angular-dependent Signature Deconvolution", SEG 53rd Annual International Meeting, Expanded Abstracts, 1983, pp. 433-435.

P. Wang et al., "3D Joint Deghosting and Crossline Interpolation for Marine Single-component Streamer Data", SEG 84th Annual International Meeting, Denver, Colorado, Expanded Abstracts, Oct. 26-31, 2014, pp. 3594-3598.

P. Wang et al., "Joint 3D Source-side Deghosting and Designature for Modern Air-gun Arrays", 77th EAGE Conference & Exhibition, IFEMA, Madrid, Spain, Jun. 1-4, 2015.

A. Ziolkowski et al., "The Signature of an Air Gun Array: Computation from Near-Field Measurements Including Interactions", Geophysics, Oct. 1982, vol. 47, No. 10, pp. 1413-1421.

\* cited by examiner

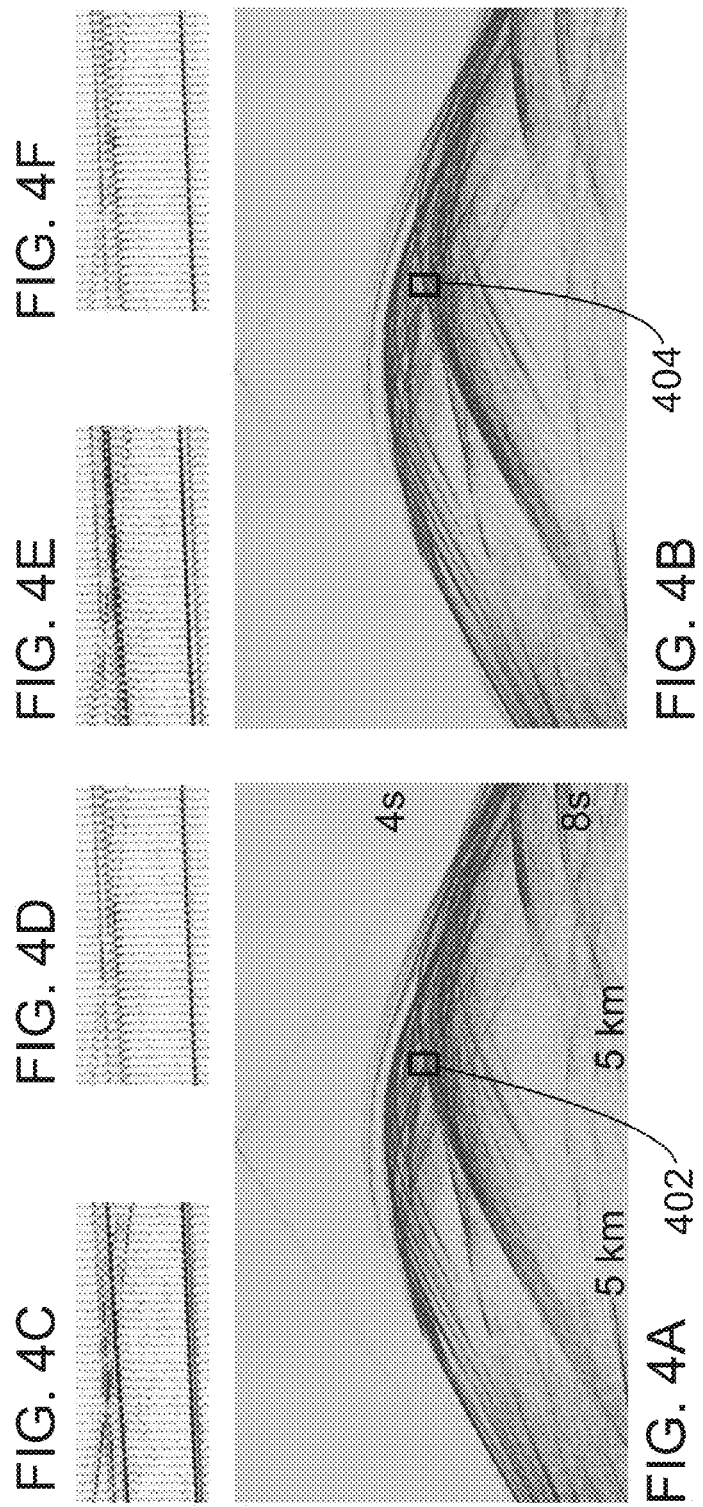

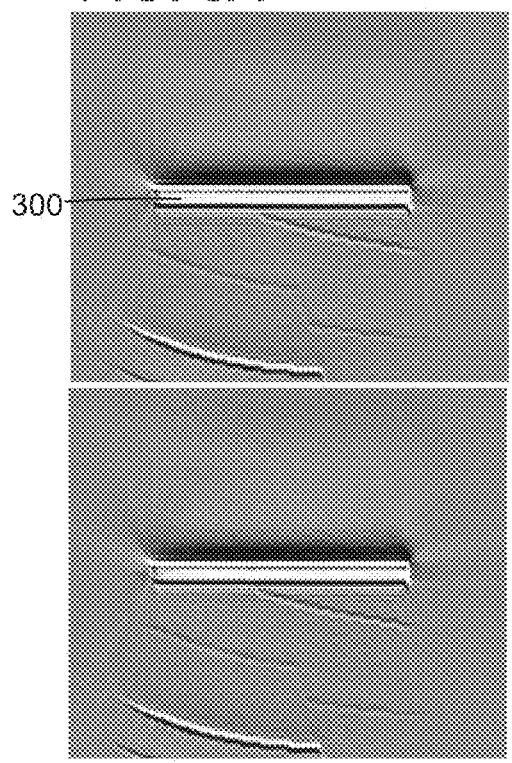
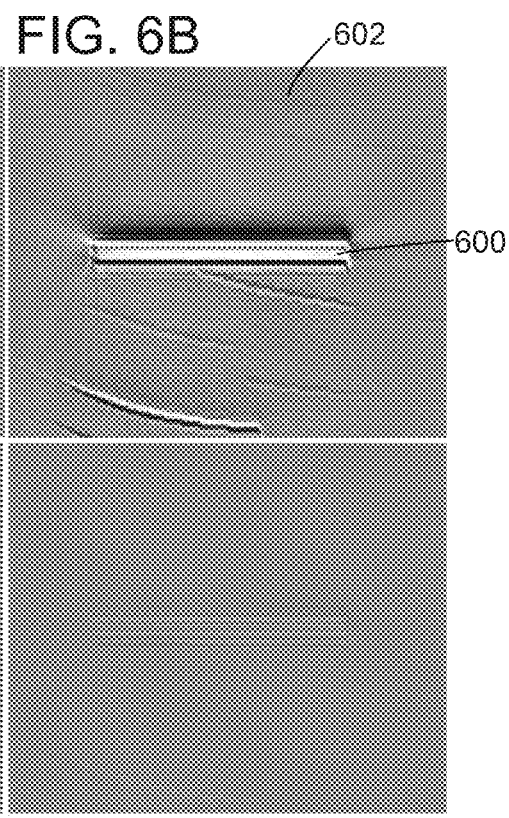
FIG. 6A  FIG. 6B
FIG. 6C  FIG. 6D

DEVICE AND METHOD FOR JOINT 3-DIMENSIONAL DEGHOSTING OF MULTIPLE VINTAGES

CROSS-REFERENCE TO RELATED APPLICATIONS

The present application is related to and claims the benefit of priority of U.S. Provisional Application 62/139,880, filed Mar. 30, 2015, the entire contents of which are incorporated herein by reference.

BACKGROUND

Technical Field

Embodiments of the subject matter disclosed herein generally relate to methods and systems and, more particularly, to mechanisms and techniques for deghosting wave-fields belonging to different vintages collected at various times.

Discussion of the Background

Seismic data acquisition and processing generate a profile (image) of the geophysical structure (subsurface) underground. While this profile does not provide an accurate location for oil and gas, it suggests, to those trained in the field, the presence or absence of oil and/or gas. Thus, providing a high-resolution image of the subsurface is an ongoing process for the exploration of natural resources, including, among others, oil and/or gas.

Recently, so-called 4-dimensional (4D) or time-lapse surveys have become an important addition to the product offerings of seismic survey companies. In 4D surveys, a first survey (baseline) taken at a first time operates as a baseline to indicate the potential presence/absence of hydrocarbon deposits in a given area. A second survey (monitor), taken later in time (months or years), operates to indicate the change in hydrocarbon deposits in the same geographical area, e.g., after removal of the hydrocarbons has occurred. By comparing the two surveys, a 4D picture (where time is the fourth dimension) can be developed which can be used for a number of purposes, e.g., to determine the continued viability of a hydrocarbon field, where to drill, when to inject a liquid to stimulate production, well management, etc. However, in order for a 4D survey to be accurate, the first and second surveys need to be performed in a very similar manner, e.g., shot position, receiver position, etc. This gives rise to a need to make surveys highly repeatable and to determine when subsequent surveys are not accurate repetitions of an earlier, baseline survey.

However, the earlier seismic surveys located the seismic receivers at a same depth, thus not being able to achieve broadband data. The more recent seismic surveys place the seismic receivers at variable and/or deeper depths, resulting in a broadband data acquisition.

Broadband processing that involves receiver deghosting (Özdemir et al., 2008; Riyanti et al., 2008; Poole, 2013; Wang et al., 2014), shot deghosting/designature (Van der Schans and Ziolkowski, 1983; Poole et al., 2013; Wang et al., 2015), and broadband surveys (Carlson et al., 2007; Robertsson et al., 2008; Soubaras, 2010) have been widely accepted as methods for extending the bandwidth of marine seismic data. Two questions have been frequently raised in the context of 4D time-lapse processing: (1) is it possible to obtain deghosted 4D signals for broader bandwidth monitors and conventional baselines, and (2) is it possible to apply 4D processing between conventional surveys and broadband surveys? In an attempt to answer both questions, Hicks et al. (2014) demonstrated that deghosting was possible and important for 4D processing of multiple vintages with different receiver-depth profiles using a 2D ghost-wavefield elimination algorithm (Poole, 2013).

Wang et al. (2014) proposed using a progressive sparse Tau-P inversion algorithm for 3D deghosting of single-component marine seismic data. This algorithm was used to deghost both baseline and monitor data sets separately in 4D processing. However, this algorithm does not take advantage of the potentially better spatial sampling from different surveys and better overall signal-to-noise (S/N) due to complementary ghost-notch frequencies (if receiver depths of two or more vintages are different).

Thus, there is a need to process traditional and new vintages, which have different frequency content and/or recording position, in a more advantageous way. Accordingly, it would be desirable to provide systems and methods with such capabilities.

SUMMARY

According to an embodiment, there is a method for joint deghosting first and second 3-dimensional (3D) seismic vintages of a same subsurface. The method includes receiving the first 3D vintage; receiving the second 3D vintage, wherein the second 3D vintage is taken later in time than the first 3D vintage, over the same subsurface; jointly deghosting the first and second 3D vintages based on a common ghost-free model $U_0$, a first vintage ghost-free model $U_b$, and a second vintage ghost-free model $U_m$; and generating an image of the subsurface indicative of changes between the first and second 3D vintages based on the common ghost-free model $U_0$.

According to another embodiment, there is a computing device for jointly deghosting first and second 3-dimensional (3D) seismic vintages of a same subsurface. The device includes an interface that receives the first 3D vintage, and the second 3D vintage, wherein the second 3D vintage is taken later in time than the first 3D vintage, over the same subsurface; and a processor connected to the interface. The processor is configured to jointly deghost the first and second 3D vintages based on a common ghost-free model $U_0$, a first vintage ghost-free model $U_b$, and a second vintage ghost-free model $U_m$; and generate an image of the subsurface indicative of changes between the first and second 3D vintages based on the common ghost-free model $U_0$.

According to still another embodiment, there is a non-transitory computer readable medium including computer executable instructions, wherein the instructions, when executed by a processor, implement instructions for jointly deghosting various vintages having different distributions of the seismic sensors.

BRIEF DESCRIPTION OF THE DRAWINGS

The accompanying drawings, which are incorporated in and constitute a part of the specification, illustrate one or more embodiments and, together with the description, explain these embodiments. In the drawings:

FIGS. 4A-B illustrate shot gathers for two vintages, FIGS. 4C and 4E illustrate a zoom-in of selected events from the two vintages, and FIGS. 4D and 4F illustrate the result of traditional deghosting and joint deghosting on the events from FIGS. 4C and 4E;

FIG. 6A shows the target event using input baseline and monitor data from no-ghost modelling, FIG. 6B shows the same after separate deghosting, FIG. 6C show the same after joint deghosting, and FIG. 6D shows the differences between the images of FIGS. 6A and 6C;

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an embodiment, there is a method that takes advantage of the better spatial sampling of one survey relative to another one (if receivers of two or more vintages are not perfectly collocated) and better overall signal-to-noise (S/N) due to complementary ghost-notch frequencies (if receiver depths of two or more vintages are different), so that the method performs joint 3D deghosting of multiple vintages.

Figure 1:
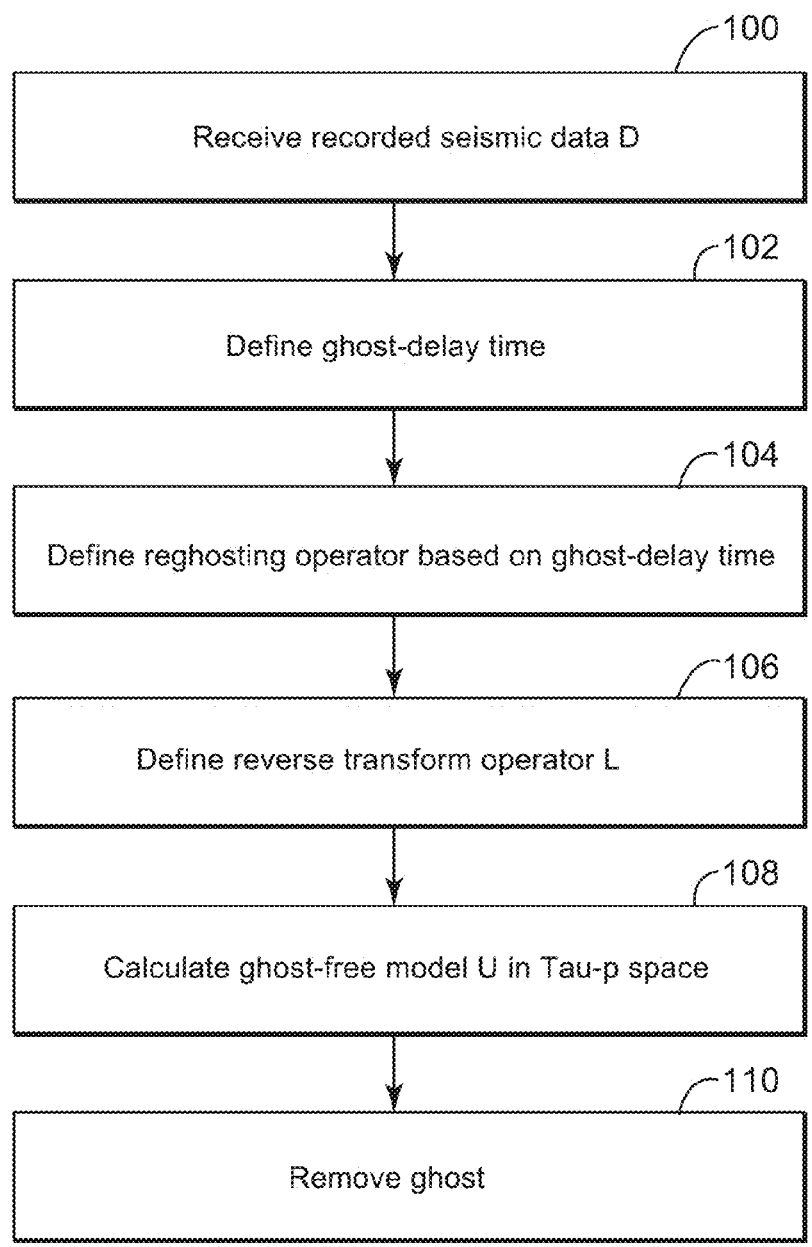
FIG. 1 is a flowchart of a method for separate deghosting of different vintages.

Sparse 3D Tau-P inversion has been proposed for 3D deghosting of a single set of marine seismic data (Wang et al., 2014). This method was applied in the common-shot domain for marine towed-streamer data and in the common-node domain for ocean-bottom node (OBN) data. According to this method, as illustrated in FIG. 1, recorded seismic data D is received in step 100. The 3D deghosting algorithm finds a ghost-free $\tau$-$p_x$-$p_y$ model, U, at surface datum that best fits the recorded data, D, when reghosted and inverse $\tau$-$p_x$-$p_y$ transformed as follows:

$$D(f; x^i, y^i, z^i) = \sum_j L(f; x^i, y^i; p_x^j, p_y^j) R(f; z^i; p_x^j, p_y^j) U(f; p_x^j, p_y^j) \quad (1)$$

where f is the frequency, L is the reverse $\tau$-$p_x$-$p_y$ transform operator, R is the reghosting operator, $(x^i, y^i, z^i)$ is the receiver location, and $(p_x^j, p_y^j)$ is the slowness pair (i: trace index, j: slowness index). A transform, for example, Fast Fourier Transform (FFT), is applied to transform the time $\tau$ or t into frequency f. The reghosting R and reverse transform $\tau$-$p_x$-$p_y$ operator L are applied step-by-step to the recorded data as now discussed with regard to FIG. 1.

In step 102, in the $\tau$-$p_x$-$p_y$ domain, the ghost-delay time $T_i^j$ can be written as a function of the receiver depth $z^i$, the water velocity v, and the slowness $(p_x^j, p_y^j)$ as follows:

$$T_i^j = 2z^i \sqrt{v^{-2} - (p_x^j)^2 - (p_y^j)^2}. \quad (2)$$

Once the ghost-delay time is known, the reghosting operator R is defined in step 104 as:

$$R(f; z^i; p_x^j, p_y^j) = e^{i\pi f T_i^j} - e^{i\pi f T_i^j}. \quad (3)$$

The first term in equation (3) redatums the ghost-free wavefield from surface datum to obtain the up-going wavefield at the cable datum and the second term generates the down-going wavefield (the receiver ghost) at the mirror cable datum and reverses the polarity.

The reverse transform $\tau$-$p_x$-$p_y$ operator L can be written in step 106 as a function of the horizontal receiver location $(x^i, y^i)$ and the slowness $(p_x^j, p_y^j)$ as follows:

$$L_j^i = e^{-2\pi f(x^i p_x^j + y^i p_y^j)}. \quad (4)$$

Equation (1) can be rewritten in more compact form as:

$$D = LRU. \quad (5)$$

In 4D time-lapse processing, equation (5) can be applied to both baseline data $D_b$ and monitor data $D_m$ to calculate in step 108 the ghost-free model U and to remove in step 110 the receiver ghost, separately from the baseline and the monitor, as expressed by equations (6):

$$\begin{cases} D_b = L^b R^b U_b \\ D_m = L^m R^m U_m \end{cases} \quad (6)$$

where symbols with superscript or subscript "b" and "m" are for baseline and monitor data, respectively. Note that although "b" is used for the baseline survey, if multiple monitors exist for a given subsurface, one of the monitor may be considered to be the baseline survey.

However, a limitation of this method is that there are no interactions between the two deghosting inversions expressed by Equation (6), in steps 108 and 110. To take advantage of the potentially better spatial sampling in one of the surveys and better overall S/N due to complementary ghost-notch frequencies, the inversion scheme of the method illustrated in FIG. 1 is modified as now discussed with reference to FIG. 2.

Figure 2:
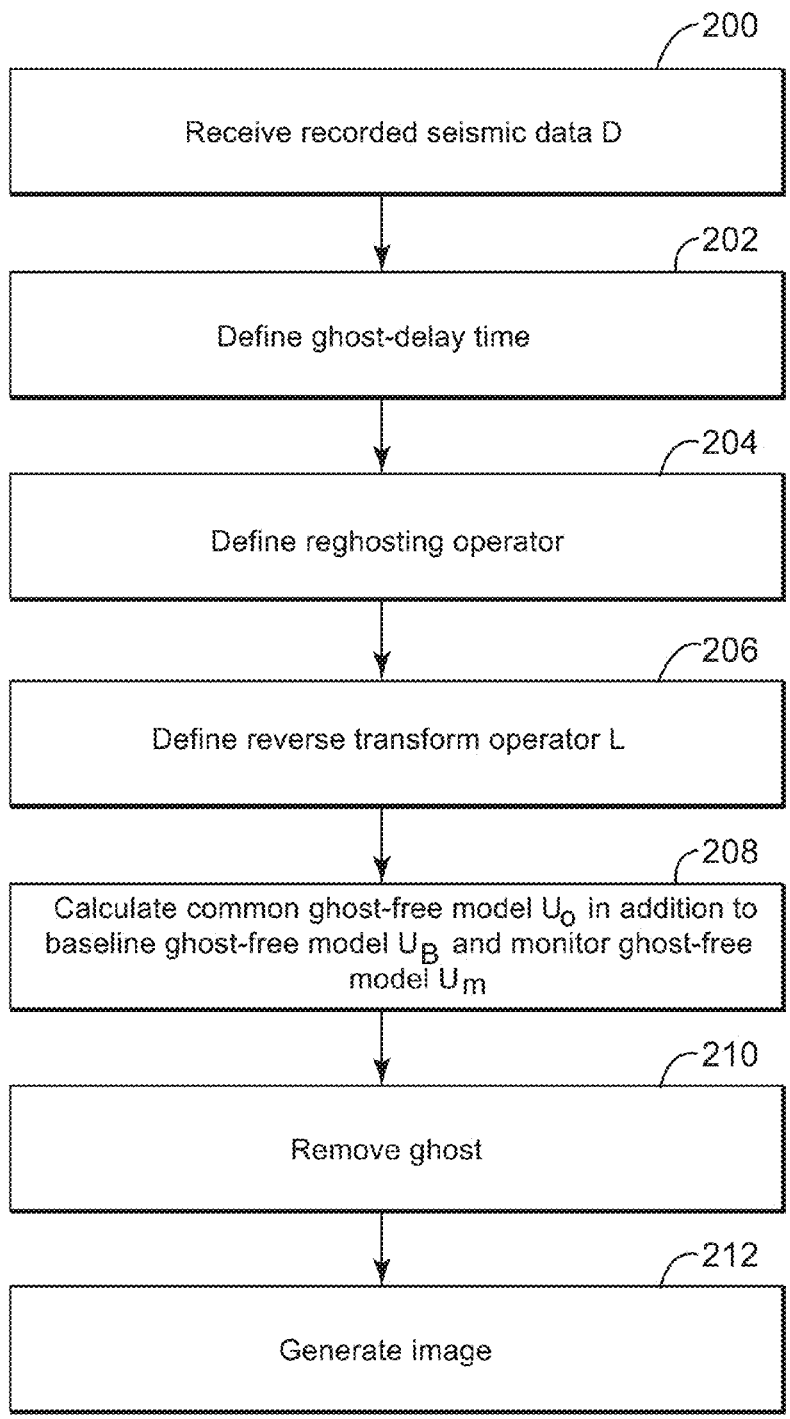
FIG. 2 is a flowchart of a method for joint deghosting of different vintages.

FIG. 2 shows a novel method that jointly deghosts the baseline and monitor data sets. While steps 200 to 206 may be similar to steps 100 to 106 in FIG. 1, step 208 differs as now discussed. Instead of treating each vintage separately, a common ghost-free model $U_0$ is introduced in addition to the baseline ghost-free model $U_b$ and the monitor ghost-free model $U_m$. While the method is explained herein with reference to baseline and vintage data sets, the method is also applicable to any two vintages.

The inversion equation (6) is modified to solve the common ghost-free model $U_0$ and the individual ghost-free models $U_b$ and $U_m$ to fit both the baseline and monitor data, respectively. The modified equation is as follows:

$$\begin{pmatrix} D_b \\ D_m \end{pmatrix} = \begin{pmatrix} L^b R^b & L^b R^b & 0 \\ L^m R^m & 0 & L^m R^m \end{pmatrix} \begin{pmatrix} U_0 \\ U_b \\ U_m \end{pmatrix}. \quad (7)$$

With this new equation, it is possible to deghost in step 210 the common events in both vintages consistently while preserving the difference between the two vintages in the individual ghost-free models $U_b$ and $U_m$. To maximize the deghosting consistency, the inversion is prioritized to obtain a common model $U_0$, which fits both the baseline and monitor data as much as possible.

In one application, equation (7) can be split into two steps:
1. Find a common model $U_0$, to explain both $D_b$ and $D_m$ as much as possible based on equation (8):

$$\begin{pmatrix} D_b \\ D_m \end{pmatrix} = \begin{pmatrix} L^b R^b \\ L^m R^m \end{pmatrix} U_0. \quad (8)$$

2. Find $U_b$ and $U_m$ to match the residual described in equation (9):

$$\begin{pmatrix} D_b - L^b R^b U_0 \\ D_m - L^m R^m U_0 \end{pmatrix} = \begin{pmatrix} L^b R^b \\ L^m R^m \end{pmatrix} \begin{pmatrix} U_b \\ U_m \end{pmatrix}. \quad (9)$$

Models $U_0$, $U_b$ and $U_m$ are determined in step 208 and they are in the tau-p space. In step 210, these models are used to remove the ghost and transform the deghosted data back to the space-time domain in which the original seismic data D has been recorded. Note that an FFT may be applied in step 208 to transform the time into the frequency.

Figure 3:
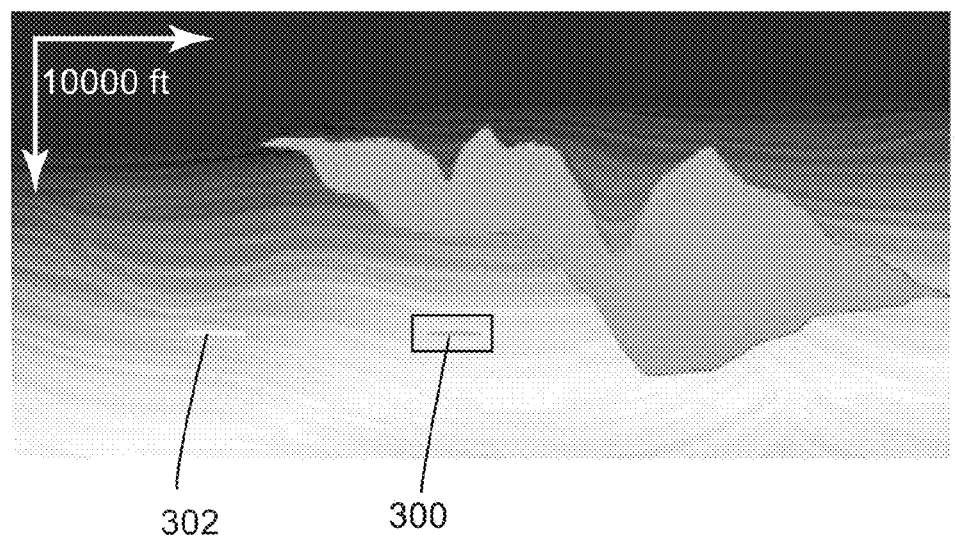
FIG. 3 is a model of a salt having two deep events.

The method noted above has been tested on 2D synthetic data with receiver ghost only. The baseline model used the original Sigsbee2A model whereas the monitor model used a modified Sigsbee2A model with two 4D events 300 and 302 in the deep section of FIG. 3. The receiver depths of the baseline and monitor data were about 9 m and 15 m, respectively.

FIGS. 4A and 4B show a shot gather for the baseline and monitor, respectively. FIGS. 4C and 4E show the zoom-in of the boxes 402 and 404 in FIGS. 4A and 4B, respectively. It can be observed that the wavelets (see FIGS. 4C and 4E) of the baseline and monitor data are different due to different receiver depths. FIGS. 4D and 4F show the deghosted data (calculated with the method illustrated in FIG. 2) corresponding to the data from FIGS. 4C and 4E, respectively.

Figure 5A:
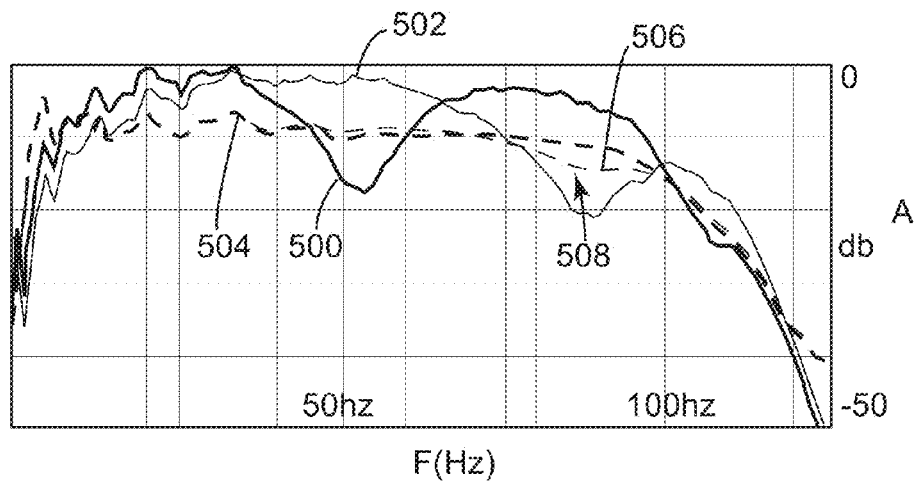
FIG. 5A shows the spectral comparison of the baseline and monitor data before and after separate deghosting and FIG. 5B shows the spectral comparison of the baseline and monitor data before and after joint deghosting.
Figure 5B:
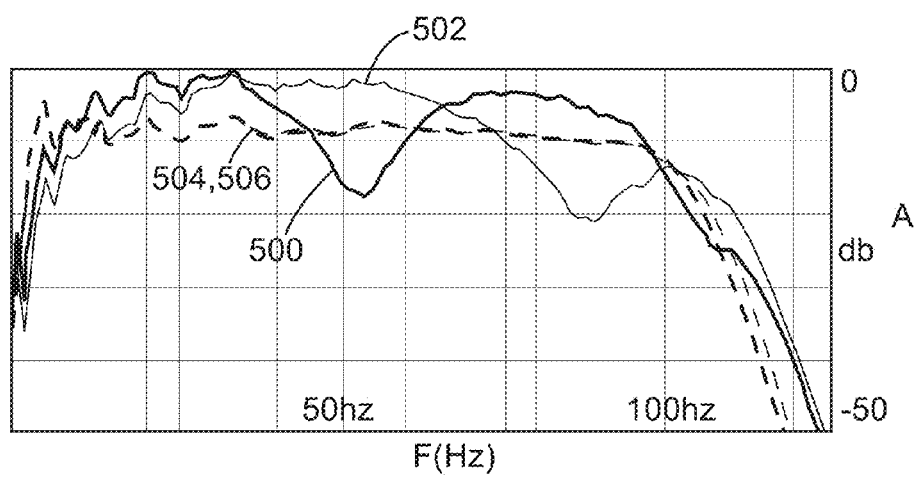

FIG. 5A shows the spectral comparison of the baseline and monitor data before and after traditional modeling, i.e., separate deghosting based on equation (6). The amplitude spectra 500 (for monitor) and 502 (for baseline) of both data before deghosting were very different due to the different receiver depths. The amplitude spectra 504 and 506 become similar after separate receiver deghosting based on equation (6). However, there are some residual ghost notches 508 for both data. On the other hand, when the joint deghosting method of FIG. 2 is applied, the results are better, as illustrated in FIG. 5B by the disappearance of the residual ghost notches 508.

FIGS. 6A-D illustrate the migration differences between the baseline and monitor data around the target 4D event 300 below the salt. The original Sigsbee2A model was used to migrate both baseline and monitor data. This rendered kinematic errors below the target event for monitor data. It is observed large 4D differences below the target event using input baseline and monitor data from no-ghost modelling (FIG. 6A), after separate deghosting (FIG. 6B) and joint deghosting (FIG. 6C). The joint deghosting illustrated in FIG. 6C gives smaller difference than the separate deghosting of FIG. 6B, above the target event, where theoretically, no 4D difference is expected (FIG. 6A). In this regard, note events 602 in FIG. 6B, above the target event 600, which should not be there. FIG. 6D shows the 4D error between the 4D difference of joint deghosting (FIG. 6C) and the ground truth (FIG. 6A).

These embodiments illustrate that joint 3D deghosting of baseline and monitor data (or two monitor data) provides more accurate deghosting and more reliable 4D difference. The success of the joint 3D deghosting is due to (1) better spatial sampling, (2) better full-bandwidth S/N due to ghost-notch diversity, and (3) consistent deghosting of common events while preserving their differences.

The method discussed above with regard to FIG. 2 assumes the ghost-free wave-fields from baseline and monitor data match each other before the joint deghosting inversion. Therefore, its success relies on how well it is possible to perform water column correction, source designature/debubbling, and amplitude normalization. In the presence of strong noise, like any other deghosting process, joint deghosting inversion may significantly amplify the noise, which may degrade the 4D analysis. In this case, a better strategy may be to perform joint 3D deghosting of baseline and monitor data and then reghost both ghost-free data using the same receiver depth to suppress the noise amplification.

The algorithm discussed herein for joint 3D receiver deghosting of baseline and monitor towed-streamer data can be readily extended for joint 3D source deghosting of baseline and monitor OBN data. It can also be extended for joint 3D regularization of baseline and monitor data for both towed-streamer and OBN acquisition geometries. In addition, this algorithm may be extended to land seismic surveys, where the baseline has been achieved with seismic sensors deployed on the earth's surface while the monitor has been performed with buried seismic sensors. In one application, the algorithm can be extended to handle arbitrary number of vintages (>2), which can be a mixing of pressure data and pressure data and velocity (acceleration) data.

Figure 7:
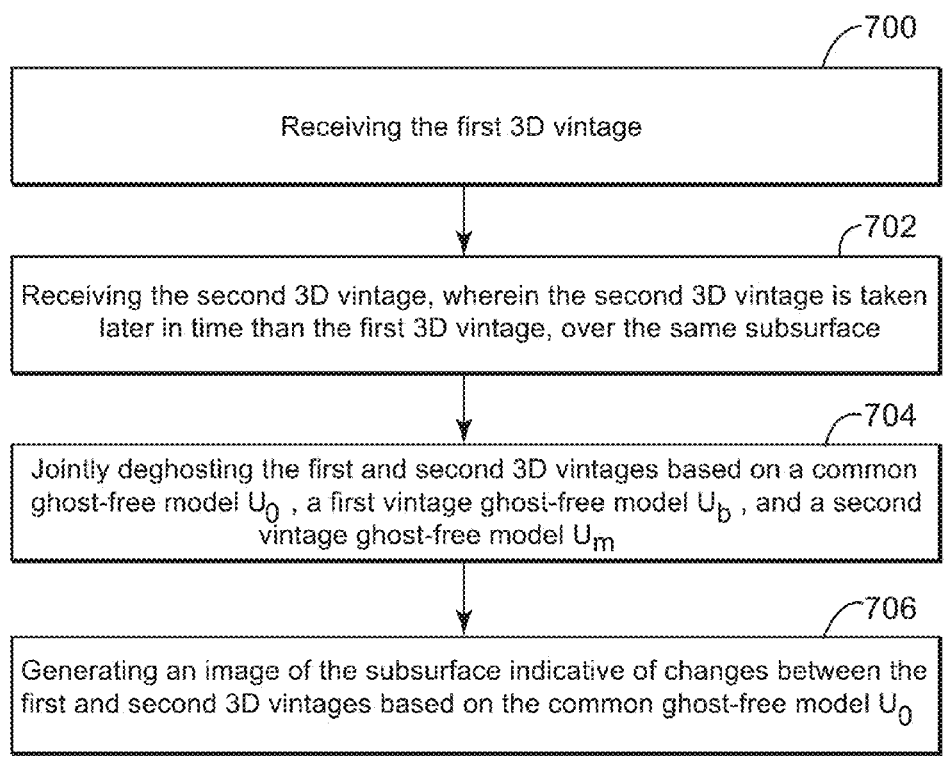
FIG. 7 is a flowchart of a method of joint deghosting two different vintages.

A method for joint deghosting first and second 3-dimensional vintages of a same subsurface is now discussed with regard to FIG. 7. The method includes a step 700 of receiving the first 3D vintage, a step 702 of receiving the second 3D vintage, wherein the second 3D vintage is taken later in time than the first 3D vintage, over the same subsurface. The method also includes a step 704 of jointly deghosting the first and second 3D vintages based on a common ghost-free model $U_0$, a first vintage ghost-free model $U_b$, and a second vintage ghost-free model $U_m$, and a step 706 of generating an image of the subsurface indicative of changes between the first and second 3D vintages, based on the common ghost-free model $U_0$. Note that step 704 includes repeatedly calculating the common ghost-free model $U_0$ and/or the other models $U_b$ and $U_m$ until equation (7) is satisfied, i.e., the reghosted models when reverse transformed fit, within a certain range, the measured seismic data.

In one embodiment, the common ghost-free model $U_0$ and the first vintage ghost-free model $U_b$ are used for deghosting the first 3D vintage and the common ghost-free model $U_0$ and the second vintage ghost-free model $U_m$ are used for deghosting the second 3D vintage. In one application, the common ghost-free model $U_0$ and the first vintage ghost-free model $U_b$ are reghosted and reverse transformed from a model domain to a data domain to fit the first 3D vintage and the common ghost-free model $U_0$ and the second vintage ghost-free model $U_m$ are reghosted and reverse transformed from the model domain to the data domain to fit the second 3D vintage. The model domain may be a tau-p domain and the data domain is a time-space domain.

Input data for any of the above methods may be in any pre-stack domain, for example shot, receiver, midpoint, conversion point or cross-spread. The intention is that any of the above implementations would be made on a dedicated computer that is capable of supporting seismic processing. While many of the previous embodiments may use multi-component measurements, it should be noted that where signal-to-noise ratio and sampling allows, the scheme(s) may be used with less data, e.g., hydrophone data only or particle motion data only. Also, it may be possible to use as input pressure and particle motion data and to generate output that includes only pressure wave-fields or only particle motion wave-fields.

The input vintage data may be obtained from individual sensors, or summed (average or weighed sum) to form a receiver group. Pressures may have been acquired from hydrophones while particle velocity data may have been acquired directly or may be computed from accelerometer sensors (for example, by integration). Other types of particle motion sensor may be available. Seismic receivers generate a marine streamer dataset that is achieved in a narrow, wide or multi-azimuth, coil shooting or any configuration towed with constant or variable depth (e.g., slant streamer, Broad-Seis profile, over-under streamers), and the seismic data is generated with an air gun, marine vibrator, or other source element. Source elements may be fired according to any known scheme, e.g., continuously, simultaneously, flip-flop, etc. Receivers may also be used in ocean bottom survey (nodes, cables, or other with air gun, marine vibrator or other source), land dataset (dynamite, vibrator or other source), or a combination of two or more dataset types. The data may have been calibrated before applying the processes discussed herein. Water velocity terms may be constant or allowed to vary with depth. Variation with depth can be of use for OBS datasets where there is a water velocity gradient. The methods may be used for one-sided or split-spread acquisition.

Equation (7) described herein may be solved in the time domain or a spectral domain (e.g., frequency, Laplace, z-transform, etc.), wavelet domain (e.g., curvelet or other). Models $U_0$, $U_b$ and $U_m$ may be found through any inversion method, e.g., conjugate gradients, LU decomposition, Cholesky factorization, etc. These models may be derived to represent all traces in the input shot, or may work on a subset of data from the input shot, for example, spatial windows of a given number of channels. Sparseness weights may be used in the inversion to improve results, for example, where there is poor signal-to-noise ratio or to overcome aliasing; e.g., iteratively reweighted least squares beginning with low frequencies and working up to higher frequencies. Other model domains may be used, for example, frequency-wavenumber (FK), parabolic Radon, hyperbolic Radon, etc. In fact, any fixed datum model domain may be defined as long as it can be reverse transformed, redatumed and reghosted for one or both of hydrophone and particle velocity sensor data. Alternatively, an iterative approach similar to the anti-leakage τ-p transform can be used, which also exhibits sparseness properties. No matter how the model is formed, it needs to simultaneously reproduce the baseline and vintage (or two vintages) measurements through application of an operator, e.g., L.

Figure 8:
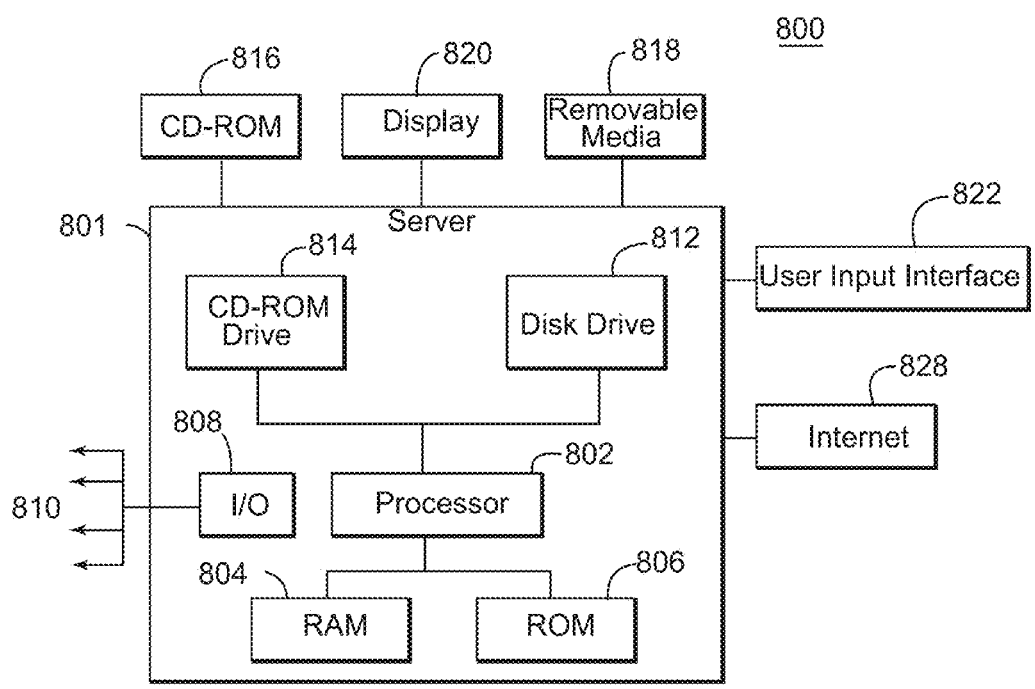
FIG. 8 is a schematic diagram of a computing device that can implement any of the methods discussed herein.

The above-discussed procedures and methods may be implemented in a computing device as illustrated in FIG. 8. Hardware, firmware, software or a combination thereof may be used to perform the various steps and operations described herein. Computing device 800 of FIG. 8 is an exemplary computing structure that may be used in connection with such a system.

Exemplary computing device 800 suitable for performing the activities described in the exemplary embodiments may include a server 801. Such a server 801 may include a central processor (CPU) 802 coupled to a random access memory (RAM) 804 and to a read-only memory (ROM) 806. ROM 806 may also be other types of storage media to store programs, such as programmable ROM (PROM), erasable PROM (EPROM), etc. Processor 802 may communicate with other internal and external components through input/output (I/O) circuitry 808 and bussing 810 to provide control signals and the like. Processor 802 carries out a variety of functions as are known in the art, as dictated by software and/or firmware instructions.

Server 801 may also include one or more data storage devices, including hard drives 812, CD-ROM drives 814 and other hardware capable of reading and/or storing information, such as DVD, etc. In one embodiment, software for carrying out the above-discussed steps may be stored and distributed on a CD-ROM or DVD 816, a USB storage device 818 or other form of media capable of portably storing information. These storage media may be inserted into, and read by, devices such as CD-ROM drive 814, disk drive 812, etc. Server 801 may be coupled to a display 820, which may be any type of known display or presentation screen, such as LCD, plasma display, cathode ray tube (CRT), etc. A user input interface 822 is provided, including one or more user interface mechanisms such as a mouse, keyboard, microphone, touchpad, touch screen, voice-recognition system, etc.

Server 801 may be coupled to other devices, such as sources, detectors, etc. The server may be part of a larger network configuration as in a global area network (GAN) such as the Internet 828, which allows ultimate connection to various landline and/or mobile computing devices.

The disclosed exemplary embodiments provide a computing device, software instructions and a method for joint deghosting of seismic data sets. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

REFERENCES

Carlson, D., A. Long, W. Sollner, H. Tobti, R. Tenghamn, and N. Lunde, 2007, Increased resolution and penetration from a towed dual-sensor streamer: *First Break*, 25, 71-77.

Hicks, E., H. Hoeber, G. Poole, and B. King, 2014, An efficient 4D processing flow for variable depth streamer data: *The Leading Edge*, 33, 172-178.

Özdemir, A. K., P. Caprioli, A. Ozebek, E. Kragh, and J. Robertsson, 2008, Optimized deghosting of over/under towed-streamer data in the presence of noise: *The Leading Edge*, 27, 190-199.

Poole, G., C. Davison, J. Deeds, K. Davies, and G. Hampson, 2013, Shot-to-shot directional designature using near-field hydrophone data: 83*rd Annual International Meeting*, SEG, Expanded Abstracts, 4236-4240.

Poole, G., 2013, Pre-migration receiver de-ghosting and re-datuming for variable depth streamer data: 83*rd Annual International Meeting*, SEG, Expanded Abstracts, 4216-4220.

Riyanti, C. D., R. G. Van Borselen, P. M. van den Berg, J. T. Fokkema, 2008, Pressure wavefield deghosting for non-horizontal streamers: 78*th Annual International Meeting*, SEG, Expanded Abstracts, 2652-2656.

Robertsson, J., I. Moore, M. Vassallo, A. K. Özdemir, D. J. van Manen, and A. Özbek, 2008, On the use of multicomponent streamer recordings for reconstruction of pressure wavefields in the crossline direction: *Geophysics*, 73(5), A45-A49.

Van der Schans, C. A. and A. M. Ziolkowski, 1983, Angular-dependent signature deconvolution: 53*rd Annual International Meeting*, SEG, Expanded Abstracts, 433-435.

Wang, P., S. Ray, and K. Nimsaila, 2014, 3D joint deghosting and crossline interpolation for marine single-component streamer data: 84*th Annual International Meeting*, SEG, Expanded Abstracts, 3594-3598.

Wang, P., K. Nimsaila, D. Zhuang, Z. Fu, H. Shen, G. Poole, and N. Chazalnoel, 2015, Joint 3D source-side deghosting and designature for modern air-gun arrays: 77*th Conference & Exhibition*, EAGE, Extended Abstracts.

Ziolkowski, A., G. E. Parkes, L. Hatton, and T. Haughland, 1982, The signature of an air gun array: Computation from near-field measurements including interactions: *Geophysics*, 47, 1413-1421.

What is claimed is:

1. A method for joint deghosting first and second 3-dimensional (3D) seismic vintages of a same subsurface, the method comprising:
    receiving the first 3D vintage;
    receiving the second 3D vintage, wherein the second 3D vintage is taken later in time than the first 3D vintage, over the same subsurface;
    jointly deghosting the first and second 3D vintages based on obtaining by inversion a common ghost-free model $U_0$, a first vintage ghost-free model $U_b$, and a second vintage ghost-free model $U_m$;
    generating an image indicative of changes occurring in the subsurface between the first and second 3D vintages based on the common ghost-free model $U_0$; and
    using the image for making a decision related to exploitation of a hydrocarbon deposit in the subsurface,
    wherein the common ghost-free model $U_0$ describes common events for the first and second vintages, the first vintage ghost-free model $U_b$ describes events specific for the first vintage, and the second vintage ghost-free model $U_m$ describes events specific for the second vintage.

2. The method of claim 1, wherein the common ghost-free model $U_0$ and the first vintage ghost-free model $U_b$ are used for deghosting the first 3D vintage.

3. The method of claim 2, wherein the common ghost-free model $U_0$ and the second vintage ghost-free model $U_m$ are used for deghosting the second 3D vintage.

4. The method of claim 1, wherein the common ghost-free model $U_0$ and the first vintage ghost-free model $U_b$ are reghosted and reverse transformed from a model domain to a data domain to fit the first 3D vintage.

5. The method of claim 4, wherein the common ghost-free model $U_0$ and the second vintage ghost-free model $U_m$ are reghosted and reverse transformed from the model domain to the data domain to fit the second 3D vintage.

6. The method of claim 5, wherein the model domain is a tau-p domain and the data domain is a time-space domain.

7. The method of claim 1, wherein the step of joint deghosting comprises:
    applying a first vintage reghosting operator $R_b$ and a first vintage reverse transform operator $L_b$ to jointly find the common ghost-free model $U_0$ and the first vintage ghost-free model $U_b$.

8. The method of claim 7, wherein the step of joint deghosting further comprises:
    applying a second vintage reghosting operator $R_m$ and a second vintage reverse transform operator $L_m$ to jointly find the common ghost-free model $U_0$ and the second vintage ghost-free model $U_m$.

9. The method of claim 1, wherein the step of joint deghosting comprises:
    applying a first vintage reghosting operator $R_b$ and a first vintage reverse transform operator $L_b$ to jointly find the common ghost-free model $U_0$ and the first vintage ghost-free model $U_b$; and
    applying a second vintage reghosting operator $R_m$ and a second vintage reverse transform operator $L_m$ to jointly find the common ghost-free model $U_0$ and the second vintage ghost-free model $U_m$,
    wherein the above two steps are jointly performed.

10. The method of claim 1, wherein the second vintage is different from the first vintage as seismic receivers used for recording the second vintage have a larger depth then seismic receivers used for recording the first vintage.

11. The method of claim 1, wherein the inversion solves the equation $$\begin{pmatrix} D_b \\ D_m \end{pmatrix} = \begin{pmatrix} L^b R^b & L^b R^b & 0 \\ L^m R^m & 0 & L^m R^m \end{pmatrix} \begin{pmatrix} U_0 \\ U_b \\ U_m \end{pmatrix}$$

where $D_b$ is the first 3D vintage, $R^b$ is a first vintage reghosting operator, $L^b$ is a first vintage reverse tau-p transform operator, $D_m$ is the second 3D vintage, $R^b$ is a second vintage reghosting operator, $L^m$ is a second vintage reverse tau-p transform operator.

12. A computing device for jointly deghosting first and second 3-dimensional (3D) seismic vintages of a same subsurface, the device comprising:
    an interface that receives the first 3D vintage, and the second 3D vintage, wherein the second 3D vintage is taken later in time than the first 3D vintage, over the same subsurface; and a processor connected to the interface and configured to,
jointly deghost the first and second 3D vintages based on obtaining by inversion a common ghost-free model $U_0$, a first vintage ghost-free model $U_b$, and a second vintage ghost-free model $U_m$;
generate an image of the subsurface indicative of changes between the first and second 3D vintages based on the common ghost-free model $U_0$; and
using the image for making a decision related to exploitation of a hydrocarbon deposit in the subsurface,
wherein the common ghost-free model $U_0$ describes common events for the first and second vintages, the first vintage ghost-free model $U_b$ describes events specific for the first vintage, and the second vintage ghost-free model $U_m$ describes events specific for the second vintage.

13. The device of claim 12, wherein the common ghost-free model $U_0$ and the first vintage ghost-free model $U_b$ are used for deghosting the first 3D vintage.

14. The device of claim 13, wherein the common ghost-free model $U_0$ and the second vintage ghost-free model $U_m$ are used for deghosting the second 3D vintage.

15. The device of claim 12, wherein the common ghost-free model $U_0$ and the first vintage ghost-free model $U_b$ are reghosted and reverse transformed from a model domain to a data domain to fit the first 3D vintage.

16. The device of claim 15, wherein the common ghost-free model $U_0$ and the second vintage ghost-free model $U_m$ are reghosted and reverse transformed from the model domain to the data domain to fit the second 3D vintage.

17. The device of claim 16, wherein the model domain is a tau-p domain and the data domain is a time-space domain.

18. The device of claim 12, wherein processor is further configured to:
apply a first vintage reghosting operator $R_b$ and a first vintage reverse transform operator $L_b$ to jointly find the common ghost-free model $U_0$ and the first vintage ghost-free model $U_b$.

19. The device of claim 18, wherein the processor is further configured to:
apply a second vintage reghosting operator $R_m$ and a second vintage reverse transform operator $L_m$ to jointly find the common ghost-free model $U_0$ and the second vintage ghost-free model $U_m$.

20. A non-transitory computer readable medium including computer executable instructions, wherein the instructions, when executed by a processor, implement instructions for jointly deghosting first and second 3-dimensional (3D) seismic vintages of a same subsurface, the instructions comprising:
receiving the first 3D vintage;
receiving the second 3D vintage, wherein the second 3D vintage is taken later in time than the first 3D vintage, over the same subsurface;
jointly deghosting the first and second 3D vintages based on obtaining by inversion a common ghost-free model $U_0$, a first vintage ghost-free model $U_b$, and a second vintage ghost-free model $U_m$; and
generating an image of the subsurface indicative of changes between the first and second 3D vintages based on the common ghost-free model $U_0$; and
using the image for making a decision related to exploitation of a hydrocarbon deposit in the subsurface,
wherein the common ghost-free model $U_0$ describes common events for the first and second vintages, the first vintage ghost-free model $U_b$ describes events specific for the first vintage, and the second vintage ghost-free model $U_m$ describes events specific for the second vintage.

* * * * *